United States Patent [19]

Geyling et al.

[11] 4,390,589
[45] Jun. 28, 1983

[54] METAL COATING OF FIBERS

[75] Inventors: Franz T. Geyling, Morristown; Theodore J. Louzon, Bridgewater, both of N.J.

[73] Assignee: Bell Telephone Laboratories, Incorporated, Murray Hill, N.J.

[21] Appl. No.: 352,511

[22] Filed: Feb. 26, 1982

[51] Int. Cl.³ ................ G02B 5/14; G02B 1/10; B05D 7/70; B05D 1/18
[52] U.S. Cl. .................... 428/381; 350/96.29; 427/163; 427/398.1; 427/404; 427/431; 427/433; 428/379; 428/388; 428/389
[58] Field of Search ............... 427/163, 398.1, 404, 427/431, 433; 428/379, 381, 388, 389; 350/96.29

[56] References Cited

U.S. PATENT DOCUMENTS

| | | |
|---|---|---|
| 3,772,079 | 11/1973 | Louzon . |
| 4,089,585 | 5/1978 | Slaughter et al. . |
| 4,113,350 | 9/1978 | Haines . |
| 4,252,457 | 2/1981 | Benson et al. . |

FOREIGN PATENT DOCUMENTS

| | | |
|---|---|---|
| 51-109397 | 9/1976 | Japan . |
| 1038534 | 8/1966 | United Kingdom . |
| 1585899 | 3/1981 | United Kingdom . |

OTHER PUBLICATIONS

Vogel et al., "Adhesion of Evaporated Metallic Films onto Polyethylene and Poly(tetrafluoroethylene): Importance of Surface Crosslinking," *Journal of Applied Polymer Science,* vol. 23, pp. 495–501 (1979).
Spencer et al., "Reological Behavior of Tin–15% Lead in the Crystallization Range", *MIT Research Report,* pp. 1–19, FIGS. 1–13, Nov. 1971.
Kompfner et al., "The Metal Coating of Optical Fibres", *Applications of Quantum Electronics,* University of Oxford, pp. 54–78 (1975).
Pinnow et al., "Reductions in Static Fatigue of Silica Fibers by Hermetic Jacketing," *Applied Physics Fiters,* vol. 34, No. 1, pp. 17–19, Jan. 1979.
Wysocki et al., "Mechanical Properties of High-Strength Metal-Coated Fibers," *Conf. Proc. of the International Wire and Cable Symposium,* Cherry Hill, NJ, p. 22 (1981).
Sato et al., "Metal-Coated Optical Fiber with Pure Indian," *Conf. Proc. of the International Wire and Cable Symposium,* Cherry Hill, NJ, pp. 22–23 (1981).
Almeida et al., "On Line Metal-Coating of Optical Fibres," *Optik,* vol. 53, No. 3, pp. 231–233 (1979).
Flemings et al., "Rheocasting," *Materials Science and Engineering,* vol. 25, pp. 103–117 (1976).

*Primary Examiner*—James R. Hoffman
*Attorney, Agent, or Firm*—James H. Fox

[57] ABSTRACT

Fibers are coated with a metal layer by applying onto the fiber a relatively high viscosity slurry comprising an alloy in the form of liquid and solid phases. This allows application of metal coatings on layers that do not "wet" with the liquid metal. For example, an optical fiber having a soft polymer layer to reduce microbending losses is coated with a metal to prevent moisture entry. An alloy of Bi-Sn or In-Sn, among others, allows coating at a relatively low temperature to prevent polymer degradation. Other fibers for various uses can also be advantageously coated with this technique.

15 Claims, 2 Drawing Figures

METAL COATING OF FIBERS

BACKGROUND OF THE INVENTION

1. Field of the Invention

This invention relates to a method of making a metal-coated fiber, and fibers made thereby. In one embodiment, the fiber to be coated is a silica glass optical fiber having a polymer inner coating layer.

2. Description of the Prior Art

Optical fibers for communications and other uses are typically made of silica glass or plastic, but can be made of other materials. Dopants such as germanium, phosphorus, boron, fluorine, etc., are typically included to obtain a desired index of refraction profile in the fiber, or to facilitate manufacture of the fiber, or for other purposes. Whatever the material, it is usually desirable to protect the fiber from abrasion, water entry, and microbending losses, among other things. For this purpose, at least one coating is typically applied to an optical fiber during manufacture. Most typically, a coating layer is applied during the drawing of the fiber from a heated preform comprising glass or other material of which the optical fiber is made. This is referred to as an in-line process. However, a fiber can alternately be formed in a first operation and later coated in a separate operation. At present, organic coatings, typically polymers, are applied in-line using open cup applicators. The extrusion of nylon or other polymers onto a fiber is also known in the art.

Concurrent with the polymer coating technology, several techniques have been developed for applying inorganic materials to fibers. In certain cases, inorganic materials, for example metals, are superior to polymer coatings. This is especially true when prevention of moisture entry into contact with the fiber is desired. Moisture entry can reduce the tensile strength of the fiber and produce other undesirable effects. This is especially significant, for example, in fiber designed to be used under the ocean or to be directly buried in the ground, wherein outer layers of cabling cannot be relied upon to entirely prevent moisture entry over long periods of time in some cases. Furthermore, a metal coating on a fiber can act as a conductor for transmission of electrical power for a repeater, or for signaling, or to ensure against unauthorized access to the fiber, among other purposes.

Unfortunately, metal coatings applied directly to a glass optical fiber can in some cases degrade it through chemical action and slip plane intersection. The latter mechanism produces hardening centers at the glass-metal interface which are thought to increase microbending losses. Therefore, if a metal coating is to be applied, it should be deposited over an organic undercoating. However, the method of applying the metal coating to the organic layer must result in a sufficiently low temperature so that substantial degradation of the organic layer is avoided. This is also the case wherein the fiber itself comprises polymer material, as in the case of plastic fibers.

Typical present-day methods of applying metals to fibers include vapor deposition, plasma, jets, or freeze coatings. Another method of coating an optical fiber with a metal is to pass a silica fiber through a molten bead of a metal; for example, aluminum or an aluminum alloy. This allows for relatively high speed coating of the fiber. Unfortunately, the molten metal method requires a temperature too high for application to many polymer materials without degradation. The prior art metal application methods also typically suffer from a virtual absence of wetting between the metal coating and an organic material, which makes application difficult to polymers and other organic materials. Some metals are difficult to apply to silica glass or other inorganic materials. Therefore, it is desirable to find an alternate method of applying a metallic layer onto an optical fiber.

SUMMARY OF THE INVENTION

We have invented a method of making a metal-coated fiber by radially confining a slurry comprising a multiphase alloy that is in the form of a solid phase and a liquid phase around a fiber or an intermediate layer thereon while passing the fiber axially through a slurry confinement means, and cooling the slurry to the solid state. The slurry may also comprise other components, including nonmetallic components. In the case of silica optical fibers, the metal layer is advantageously applied as a second coating over a layer comprising polymer material that has previously been applied to the silica fiber. In cases wherein the metal is applied over polymeric material, the metal alloy is chosen so that the application temperature is sufficiently low to prevent substantial degradation of the polymer material. In one embodiment, the metal layer is applied to a layer of a material, for example a polymer material, that is not "wet" by the molten form of the alloy.

DETAILED DESCRIPTION

Figure 1:
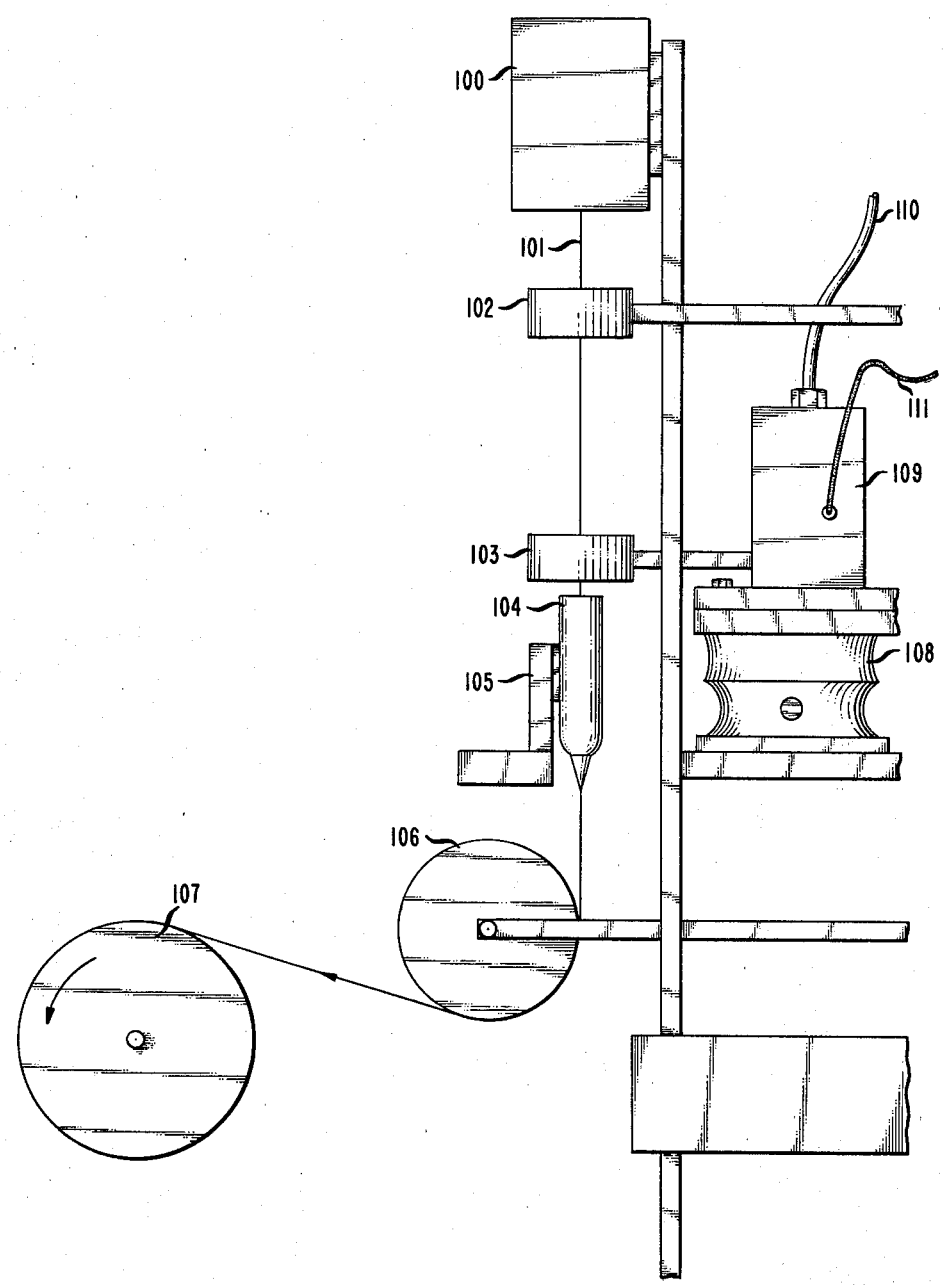
FIG. 1 shows a typical in-line drawing system wherein a glass optical fiber is drawn from a preform and subsequently coated.

The present invention concerns the metal coating of fibers by a multiphase alloy. In the present technique, alloy compositions are selected to provide a multiphase regime in a temperature range between the solidus and the liquidus. The multiphase alloy exhibits an effective viscosity which is higher than that of fully molten metals and is conductive to an extrusion process that is fluid dynamically stable after exit from the applicator.

When an alloy is not an intermetallic compound or a eutectic composition, it will cool through a mixed liquid plus solid regime. Cooling down during this regime, heat of fusion is liberated which corresponds to the amount of solid phase present, and the heat of fusion of the bulk alloy is reduced, allowing more rapid solidification in the final forming process. Rapid solidification is desirable for applying the alloy at low pressure from an applicator around a fiber. The coating is done continuously with a slurry comprising the alloy, taking advantage of the effective viscosity of the slurry to maintain a stable flow from the applicator, thus forming a metal filament that encases the fiber.

As used herein, the term "alloy" means a metallic mixture of two or more metals or of one or more metals and one or more nonmetals. A "multiphase alloy" is an alloy that exists simultaneously in one or more solid phases and one or more liquid phases upon cooling from a melt through a given temperature range above the solidus. The term "initial melting temperature" means the lowest temperature at which the alloy exists simultaneously in solid and liquid phases. The term "solid state" implies that the alloy is below the solidus temperature, with all phases then being solid phases. The term "slurry" means a mixed solid-liquid system comprising the multiphase alloy at a temperature wherein the alloy exists in both a solid and liquid phase. The term "composition of the alloy" means the relative proportions of the components of an alloy, including the solid and liquid phases. The slurry can consist entirely of a multiphase alloy or may include other nonmetallic or metallic components that are not a part of the multiphase alloy system. The term "metal layer" means a layer comprising a metal applied according to the present technique, but such layer can also include other components as discussed below. The term "intermediate layer" means the outer layer of one or more layers of material applied to the fiber before the metal layer of the present technique is applied.

For illustrative purposes, the alloys for the Examples herein consist of two metallic components of a system having a eutectic. The indium-tin (In-Sn) and bismuth-tin (Bi-Sn) systems are well suited for overcoating of organically coated optical fibers by slurry extrusion. Both are eutectic systems having low solidus temperatures of 117° C. and 139° C., respectively, and have broad liquid plus solid regimes on at least one side of the eutectic composition. Indium-tin has a lower solidus temperature and is therefore less likely to thermally degrade a polymer substrate. Bismuth-tin has a somewhat higher solidus temperature but is still suitable for coating on many organic materials. Many other multiphase alloys are possible; see, for example, *Constitution of Binary Alloys*, 2d ed., M. Hansen, McGraw-Hill (1958). Many of the known alloys having a relatively low solidus temperature comprise at least one of tin, bismuth, indium, lead, gallium, mercury, antimony or cadmium. For example, "Wood's metal" is a eutectic composition of about 50.2% bismuth, 24.8% lead, 12.6% tin, and 12.5% cadmium by weight, and has a melting temperature of about 70° C. If the proportions of these components are changed, various multiphase (noneutectic) alloys having a relatively low initial melting temperature can be obtained.

A typical coating system, as used for the examples herein, is shown in FIG. 1. A furnace (100) heats a glass preform (not shown) from which an optical fiber (101) is drawn. The fiber passes through a first applicator (102) wherein an organic first coating layer is applied. If the organic layer is an ultraviolet-curable resin, as in the Examples below, a source of ultraviolet (UV) radiation (not shown) is positioned below this applicator. The fiber then passes through a second applicator (103) wherein the metal coating layer of the present technique is applied. A water bath (104) with a flexible tip is provided for cooling the metal-coated layer, with the water bath being mounted on an X-Y mount (105). Although shown separated for clarity, the exit nozzle of the metal applicator (103) is typically immersed in the water bath (104), as discussed further below. The dual-coated fiber then passes around a pulley (106) onto a takeup drum (107). The metal applicator (103) is connected to an X-Y table (108) on which is mounted a heated reservoir (109) connected to a pressure line (110). The temperature of the molten alloy in the reservoir is measured by a thermocouple (111).

The alloy is maintained in the molten state in the heated reservoir and in the bulk of the applicator, rapidly becoming a slurry near the exit of the applicator. The slurry is maintained by the applicator in radial confinement around the fiber as the fiber passes axially through the applicator. The slurry then cools to the solid state in the water bath. It is a design objective of the metal applicator (103) to maintain the proper temperature distribution for the alloy. The alloy must be maintained at sufficiently low viscosity so as to not clog the applicator, but on the other hand, must be of sufficiently high viscosity when applied to the fiber to allow proper coating. This is especially significant for nonwettable fibers, as they tend to be pushed to one side of the exit nozzle of the applicator. Thus, a sufficiently high viscosity slurry is required near the exit to maintain adequate centering.

Figure 2:
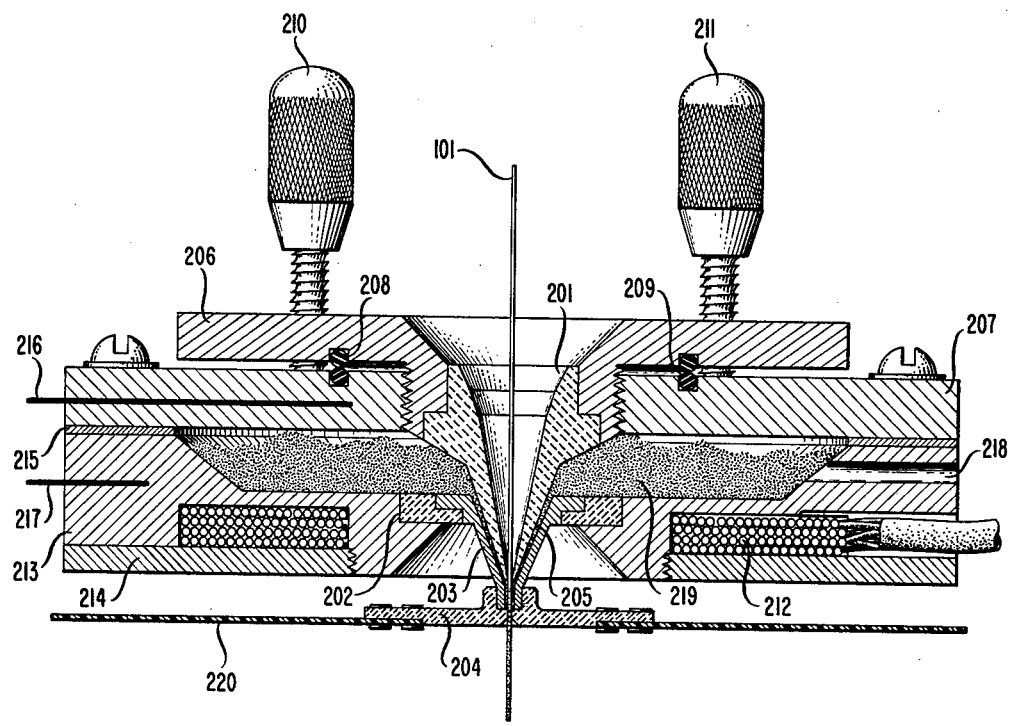
FIG. 2 shows a presently preferred applicator for coating an optical fiber according to the present technique.

A preferred design for the metal slurry applicator (103) is shown in detail in FIG. 2. The molten alloy is fed into the applicator through entrance passage (218) into the chamber (219). The alloy is typically maintained in the molten state in the chamber (219) by the heater coil (212). A conical exit valve is used to control the flow of the slurry onto the moving fiber. Adjustment of the valve gap, together with careful temperature adjustments in various parts of the applicator, provides control over the deposition of the slurry onto the fiber. A close-fitting inlet section (201) for the fiber is made of Rulon Type A ("Rulon" is a trademark of Dixon Corp. for a TFE fluorocarbon material), which is nonwettable by the metal. This inlet section provides a certain degree of built-in centering of the fiber and discourages backflow of the slurry through the top of the applicator. The exit section of the valve comprises a Rulon insulator section (202) and a tinned stainless steel liner (203) to ensure good wetting by the molten metal. This results in an axisymmetric, smooth discharge of the slurry from the bottom of the applicator. A Rulon shield (204) over the bottom of the applicator permits direct immersion of the exit into the water bath. A Teflon (trademark of E. I. DuPont for polymerized $CF_2$) outer shield (220) further insulates the lowest body section (214) from the water bath. This arrangement allows the adjustment of internal applicator temperatures from liquidus in the conical valve to a slurry temperature at the exit, and immediate water quenching of the metal-coated fiber.

In this applicator, adjustment of the valve gap (205) is provided by turning the adjustable valve support (206) which screws into the body (207) and is separated therefrom by double O rings (208 and 209). The position is held in place by thumb screws (210 and 211). The body comprises three sections (207, 213, 214) made of stainless steel to enhance heat conduction and temperature stability while maintaining minimal erosion and wetting. A copper ring (215) acts as a washer between body sections (207) and (213). A washer heater (212) is provided to control the temperature of the body. It comprises resistance wire wound on a mica core and encapsulated in sheet metal, having a thickness of about 3 mm, inside diameter about 5.1 cm, and outside diameter about 7.6 cm. It dissipates up to about 200 watts, and is controlled by a variac for temperature adjustment.

Two thermocouples (216, 217) made of chromel-alumel wire are located in body sections 207 and 213 to monitor the temperature therein; the body temperature referred to herein is the average of the two. Another set of chromel-alumel wires attached to the stainless steel liner (203) between the lowest body section (214) and the Rulon shield (204) forms a third thermocouple (not shown) to measure the temperature at the exit nozzle of the applicator. In addition, a pair of glass tubes having an inside diameter of 1 millimeter (not shown) are located in the same plane but at right angles to this thermocouple so as to pass heated nitrogen gas across the steel liner (203). In this manner, precise control of the temperature of the slurry upon exiting the applicator is obtained.

The coating technique will be more fully illustrated by means of the following Examples.

EXAMPLE 1

A 50% bismuth-50% tin (by weight) alloy was coated onto a glass fiber having a continuous coating of an ultraviolet-cured epoxy acrylate polymer resin previously applied thereto by applicator 102. The silica fiber had a diameter in the range of 100 to 125 micrometers, and the UV-cured layer was about 50 to 75 micrometers thick. The temperature of the molten metal in the reservoir was about 170° C., and the body of the metal coating applicator was 154° C. The exit nozzle was maintained at about 150° C. A continuous metal coating about 50 micrometers thick was produced on the UV-coated polymer layer. Continuously centered coatings were obtained. However, the very narrow liquid-plus-solid range of the coated slurry, being from about 139° C. to 155° C. for this alloy, made temperature control very difficult. Undershoots of temperature caused valve stoppage, while overshoots resulted in an excessively fluid slurry, tending to expel the nonwettable fiber to an off-center position.

EXAMPLE 2

A silica optical fiber with a UV-curved layer as in Example 1 was used. A 30% indium-70% tin (by weight) slurry was utilized as the metal coating, and a higher pressure was applied to the applicator to cope with the higher solid fractions in the exit orifice; that is, a higher viscosity of the slurry. This alloy has a wider biphase range, being about 117° C. to 175° C., which allowed better control of the slurry consistency and resulted in an improved coating. During this experiment, the temperature was about 180° C. in the reservoir and 164° C. to 166° C. in the body of the applicator, and 124° C. at the exit nozzle. The thickness of the metal layer was varied over a range of about 25 to 100 micrometers by varing the size of gap (205); a wider range appears possible.

Other experiments similar to above obtained good coatings on a glass fiber that had previously been coated with a silicone polymer material. In addition to the conical valve applicator of FIG. 2, other applicators have been successfully used. Examples of radial flow applicators are given in copending application, Ser. No. 257,354 (now U.S. Pat. No. 4,374,161) by the present inventors. However, the conical valve design of FIG. 2 is presently preferred due to the relative ease of avoiding clogging of the applicators by metal particles. To improve the centering of the coating when long lengths of fiber are to be coated, it is desirable to operate the coating system with a constant flow rate drive, rather than the constant pressure setup as shown in FIG. 1. This helps ensure a more uniform flow rate for the slurry, which is desirable for sustained operation. In addition, safety valves should then be provided to ensure against excessive pressure buildup. It is also possible to improve the coating uniformity by more precisely controlling the temperature gradients in the valve. This helps ensure suitably high mobility (low viscosity) of the slurry up to near the exit orifice, and may be accomplished by using independent microheaters (not shown) in the valve seat, and optimizing the geometry of the heat shield on the nozzle to maximize the stability of the internal temperature profile. Improved wettable materials are also desirable for the valve seats, although good wetting usually entails some material erosion. Excessive erosion will destroy axisymmetry and steadiness of the exit flow. In addition, some stirring or mixing, including, for example, ultrasonic excitation in the valve exit, can be used to discourage the deposition of solids in the passages and contribute to a smooth coating process.

While the applicator shown in FIG. 2 relies on a positive pressure to apply the slurry to the fiber, in some cases the drag force of the fiber itself may be sufficient for coating. Also, the present applicator applies the alloy in the form of a slurry to the fiber. However, other applicator designs (including the radial flow designs noted above) can apply the alloy initially in the molten state to the fiber, while cooling the alloy to a slurry (solid-plus-liquid) as it passes through the applicator. In the present technique, the alloy is radially confined around the fiber while the alloy is cooling in the slurry state. The radial confinement is typically maintained until the viscosity of the slurry is sufficiently high to retain the shape of the coating upon exiting the confinement means. The alloy is then typically quenched rapidly to the solid state. As used herein, the term "quenching" means cooling the slurry to the solid state sufficiently rapidly so that it substantially maintains its dimensions upon exiting the confinement means. Alternately, if a flexible tip or other suitable confinement means is provided that avoids blockage as the alloy cools to the solid state, then cooling to the solid state can be accomplished in the confinement means itself. Note that in the applicator of FIG. 2, the radial confinement occurs in the exit portion of the nozzle, with water quenching immediately thereafter.

In the above examples, wetting of the underlying polymer layer with the metal slurry was virtually absent. Thus, the metal was coated onto a layer that could not have been conveniently coated with typical prior art metal applicator techniques. However, the present technique is not limited to the use of metal coatings on nonwettable polymer layers, but can also be used when it is desired to coat with metals that are not readily applied by other techniques. It is particularly desirable when it is desired to coat at a relatively low temperature, as compared with molten metal techniques. For example, organic materials such as plastic optical fibers or polymer coating layers on glass optical fibers typically degrade at temperatures in excess of 200° C. As shown above, the present technique allows applying the metal coating at a temperature less than 200° C. Furthermore, the relative ease with which the higher viscosity slurry can be coated onto a fiber indicates that the present technique has applications even when temperature or wetting considerations are not of particular importance with the fiber being used.

While the present technique is highly desirable for use with optical fibers, fibers for other purposes can be advantageously coated with a metal layer according to the present technique. For example, glass fibers that are not of optical quality, or boron or carbon fibers, or organic fibers such as Kevlar fiber (a trademark of E. I. Dupont for an aromatic polyamide fiber), etc., can be coated according to the present technique. A metal-coated layer can provide protection against substances that can result in a strength degradation of the fiber.

When protection against water entry is desired, or to protect the fiber from attack by other substances, the metal coating of the present technique desirably forms a hermetic seal around the fiber; that is, a continuous metallic layer is formed around the fiber. In cases wherein a hermetic seal is not necessary but where other properties are desired, for example abrasion resistance, the metal layer need not be continuous. When the metal layer is used to conduct electrical power or information, the layer should be continuous along, but not necessarily around, the fiber.

The metal layer can also contain inclusions or regions of nonmetallic material, which can be either organic or inorganic. We estimate that inclusions of inorganic material, such as silica, titanium dioxide, etc., can be used to raise the modulus of the metal layer, if desired, or to improve abrasion resistance in some cases. We further postulate that including an organic material, such as an epoxy, can in some cases improve the adhesion of a metal layer to a fiber. However, in practicing the present technique, typically at least 50% by weight of the coated layer is a multiphase alloy. Many prior art techniques necessarily apply substantially circular coating layers onto a circular fiber, as viewed in cross-section. In contrast, the metal coating of the present technique can have almost any desired cross-sectional shape, as determined by the shape of the radial confinement means. Fibers for numerous other applications can be advantageously coated according to the present technique, as will be seen by persons of skill in the art.

What is claimed is:

1. A method of making a metal-coated fiber characterized by radially confining around a fiber or an intermediate layer thereon a slurry comprising a multiphase alloy that is in the form of a solid phase and a liquid phase while passing said fiber axially through a slurry confinement means, and cooling said slurry to the solid state.

2. The method of claim 1 wherein said fiber is a silica glass optical fiber.

3. The method of claim 1 wherein said fiber or intermediate layer onto which said coating layer is applied is substantially nonwettable by the molten form of said alloy.

4. The method of claim 1 wherein said fiber is a silica glass optical fiber having an intermediate layer thereon comprising an organic polymer material.

5. The method of claim 1 wherein said fiber or said intermediate layer substantially degrades at a temperature above 200° C., with said applying of said slurry being accomplished at a temperature less than 200° C.

6. The method of claim 1 wherein said fiber is a fiber selected from the group consisting of silica glass fiber, boron fiber, carbon fiber, and aromatic polyamide fiber.

7. The method of claim 1 wherein said coating layer comprising a metal forms a continuous metallic layer around said fiber or intermediate layer, thereby producing a hermetic seal.

8. The method of claim 1 wherein said alloy substantially comprises at least one element selected from the group consisting of tin, indium, bismuth, lead, gallium, mercury, antimony, and cadmium.

9. A fiber coated according to the method of claim 1.

10. An optical fiber coated according to the method of claim 4.

11. A fiber having a metallic layer thereon, characterized in that said layer is comprised of at least 50 weight percent of a multiphase alloy.

12. A coated optical fiber characterized in that said coated fiber comprises a silica glass optical fiber having an intermediate layer comprising organic polymer material thereon, and further comprises a metal layer surrounding said intermediate layer, with said metal layer being comprised of at least 50 weight percent of a multiphase alloy.

13. The fiber of claim 11 or 12 wherein said multiphase alloy has an initial melting temperature of less than 200° C.

14. The fiber of claim 11 or 12 wherein said metal layer forms a hermetic seal around said fiber or intermediate layer.

15. The fiber of claim 11 or 12 wherein said metal layer substantially comprises at least two elements selected from the group consisting of tin, indium, bismuth, lead, gallium, mercury, antimony, and cadmium.

* * * * *

UNITED STATES PATENT AND TRADEMARK OFFICE
CERTIFICATE OF CORRECTION

PATENT NO. : 4,390,589

DATED : June 28, 1983

INVENTOR(S) : Franz T. Geyling and Theodore J. Louzon

It is certified that error appears in the above—identified patent and that said Letters Patent is hereby corrected as shown below:

Column 2, line 47, "conductive" should be --conducive--.
Column 5, line 24, "UV-coated" should be --UV-cured--.
Column 5, line 34, "UV-curved" should be --UV-cured--.
Column 5, line 47, "varing" should be --varying--. Column 6, line 7, "seats" should be --seat--.

Signed and Sealed this

Twenty-seventh Day of September 1983

[SEAL]

Attest:

GERALD J. MOSSINGHOFF

Attesting Officer

Commissioner of Patents and Trademarks